(12) United States Patent
Duan et al.

(10) Patent No.: US 9,976,694 B2
(45) Date of Patent: May 22, 2018

(54) TWO-AXIS MOUNTING BASE

(71) Applicant: Xidian University, Xi'an (CN)

(72) Inventors: Xuechao Duan, Xi'an (CN); Hong Bao, Xi'an (CN); Baoyan Duan, Xi'an (CN); Shufei Feng, Xi'an (CN); Bi Cheng, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 83 days.

(21) Appl. No.: 15/224,482

(22) Filed: Jul. 29, 2016

(65) Prior Publication Data

US 2018/0023751 A1 Jan. 25, 2018

(30) Foreign Application Priority Data

Jul. 22, 2016 (CN) .......................... 2016 1 0585489

(51) Int. Cl.
*F16M 11/18* (2006.01)
*F16H 19/00* (2006.01)
*F16D 3/30* (2006.01)
*F16M 11/12* (2006.01)
*F16M 11/22* (2006.01)

(52) U.S. Cl.
CPC .............. *F16M 11/18* (2013.01); *F16D 3/30* (2013.01); *F16H 19/001* (2013.01); *F16M 11/126* (2013.01); *F16M 11/22* (2013.01)

(58) Field of Classification Search
CPC ...... F16M 11/04; F16M 11/18; F16M 11/122; F16M 11/126; A47B 2200/0042; A47B 2200/0043; A47B 2200/0044; F16H 19/001; F16D 3/30

USPC ........... 108/1, 6, 7, 8, 9, 10, 139; 248/122.1, 248/125.9, 133, 131, 139, 161, 415, 421, 248/422; 297/313, 344.21
See application file for complete search history.

(56) References Cited

U.S. PATENT DOCUMENTS

| 50,291 | A | * | 10/1865 | Whitcomb | F16M 11/10 248/371 |
|---|---|---|---|---|---|
| 206,393 | A | * | 7/1878 | Ellinger | F16M 11/14 105/150 |
| 1,344,092 | A | * | 6/1920 | Shaw | A47C 3/26 108/141 |
| 1,553,528 | A | * | 9/1925 | Hartong | A47F 5/025 108/20 |
| 1,564,359 | A | * | 12/1925 | Klein | A47B 27/14 108/6 |
| 1,699,463 | A | * | 1/1929 | Cresci | A47F 5/025 104/38 |
| 4,482,184 | A | * | 11/1984 | Mincey | A47C 4/22 297/28 |
| 5,411,334 | A | * | 5/1995 | Takei | B23Q 1/40 384/45 |

(Continued)

*Primary Examiner* — Jose V Chen
(74) *Attorney, Agent, or Firm* — Gokalp Bayramoglu (57) ABSTRACT

A mounting base for supporting and rotating an instrument about two perpendicular axes is disclosed. The mounting base includes a vertical column; a rotatable platform attached to the column by a revolute joint; a rail around the column; at least one rod, an end of the at least one rod connecting with the revolute joint; at least one sliding mechanism, connecting with the other end of the at least one rod, the sliding mechanism sliding on the rail. The mounting base is light and easily controlled with arbitrary azimuth.

17 Claims, 5 Drawing Sheets

(56) References Cited

U.S. PATENT DOCUMENTS

| | | | | |
|---|---|---|---|---|
| 6,192,808 B1* | 2/2001 | Bue | ...................... | A47B 3/0911 |
| | | | | 108/1 |
| 7,798,071 B2* | 9/2010 | Ishikawa | ............. | F16C 29/0647 |
| | | | | 108/20 |
| 2012/0201649 A1* | 8/2012 | Shen | ...................... | B60S 13/02 |
| | | | | 414/816 |

* cited by examiner

TWO-AXIS MOUNTING BASE

FIELD OF THE INVENTION

The present invention relates to a mounting base, and more particularly to a two-axis mounting base for supporting and rotating an instrument about two perpendicular axes, such as a radar, a radio telescope, a camera, a heliostat mirror, a solar panel and etc.

BACKGROUND OF THE INVENTION

An alt-azimuth or altazimuth mounting base is a simple two-axis mounting base for supporting and rotating an instrument about two perpendicular axes, i.e., one vertical axis and one horizontal axis. Rotation about the vertical axis adjusts the azimuth (compass bearing) of the pointing direction of the instrument. Rotation about the horizontal axis changes the altitude (angle of elevation) of the pointing direction.

Conventional alt-azimuth mounting base can be described as follows:

There are two active perpendicular axes (implemented with two revolute joints) in the conventional alt-azimuth mounting base. Each joint is driven by a servo motor and gear box. This type of two-axis mounting base has the advantages of a simple structure and an easy implementation of a control module. However, this type of mounting base would be very bulky for supporting a heavy instrument.

As an improved structure for a bulky instrument, another type of alt-azimuth mounting base has a circular rail and several rollers to support the weight in the azimuth motion. However, the azimuth motion is still driven by a motor and a reducer on the vertical axis.

To sum up, it is desirable to propose a novel light structure of an alt-azimuth mounting base particularly for the heavy instrument.

SUMMARY OF THE INVENTION

The objective of the invention is to provide a mounting base for supporting and rotating an instrument about two perpendicular axes, which can solve the problems of a bulky structure, large driving power and error accumulations of the driving joints.

According to one embodiment, a mounting base for supporting and rotating an instrument about two perpendicular axes is disclosed, comprising: a vertical column; a rotatable platform attached to the column by a revolute joint; a rail around the column; at least one rod, an end of the at least one rod connecting with the revolute joint; at least one sliding mechanism, connecting with the other end of the at least one rod, the sliding mechanism sliding on the rail.

According to one embodiment, the column is located at the center of the rail. The mounting base includes two rods and two sliding mechanisms, one end of each rod is both connected with the revolute joint; the other end of each rod is connected to the two sliding mechanisms respectively; and the two sliding mechanisms slides on the rail. The at least one rod is connected with the revolute joint by a universal joint. The at least one sliding mechanism is connected with the other end of the at least one rod by a three-rotational-degrees-of-freedom joint. The at least one sliding mechanism includes a gear pair, a servo motor and a reducer attached to the servo motor, and one gear of the gear pair engages with the rail. A rack is provided on the inner lateral face of the rail; and the one gear of the gear pair engages with the rack. The gear pair is located between the column and the rack, and the gear pair is driven by the servo motor and the reducer. The column is connected with ground or an external base. The axis of the column is perpendicular to the axis of the revolute joint. The shape of the rail is circular or elliptical.

According to another embodiment, a mounting base for supporting and rotating an instrument about two perpendicular axes is disclosed, comprising: a vertical column; a rotatable platform attached to the column by a revolute joint; a rail around the column; at least one extendable linear actuator, an end of the at least one actuator connecting with the revolute joint; at least one sliding mechanism, connecting with the other end of the at least one extendable linear actuator, the sliding mechanism sliding on the rail.

According to another embodiment, the mounting base includes two extendable linear actuators and two sliding mechanisms, one end of each actuator is both connected with the revolute joint; the other end of each actuator is connected to the two sliding mechanisms respectively; and the two sliding mechanisms slides on the rail. The actuators are connected with the revolute joint by universal joints. The sliding mechanisms are connected with the actuators by three-rotational-degrees-of-freedom joints. Each sliding mechanism includes a gear pair, a servo motor and a reducer attached to the servo motor, and one gear of the gear pair engages with the rail. The rack is provided on the inner lateral face of the rail; and the one gear of the gear pair engages with the rack. The gear pair is located between the column and the rack, and the gear pair is driven by the servo motor and the reducer. The shape of the rail is circular or elliptical.

According to another embodiment, a mounting base for supporting and rotating an instrument about two perpendicular axes is disclosed, comprising: a vertical column; a rotatable platform attached to the column by a revolute joint; a circular rail around the column, two rods, an end of each rod both connecting with the revolute joint; two sliding mechanisms, connecting with the other end of each rod respectively, the sliding mechanism sliding on the rail; wherein the column is located at the center of the rail; the each rod is connected with the revolute joint by a universal joint; the two sliding mechanisms are connected with the other end of each rod by three-rotational-degrees-of-freedom joints; each three-rotational-degrees-of-freedom joint has three revolute joints intersecting at one point; each sliding mechanism includes a gear pair, a servo motor and a reducer attached to the servo motor; a rack is provided on the inner lateral face of the rail; and one gear of the gear pair engages with the rack; the gear pair is driven by the servo motor and the reducer; the axis of the column is perpendicular to the axis of the revolute joint.

According to another embodiment, a method for adjusting central angles of the mounting base is disclosed. The thresholds for the pitch angle of the rotatable platform are 0 and 90 degrees, the central angles of sliding mechanisms are $\theta_0$ and $\theta_1$, and the radius of the circular trail R is calculated as:

$$R = \frac{H_0(R_p\cos\alpha + d)}{d_1(\sin\theta_0 - \sin\theta_1) - d\cos\theta_1 + R_p\cos\alpha\cos\theta_0}$$

wherein d refers to an elevation difference between the connecting point of the rotatable platform and the rod and the horizontal revolute joint;

$$\alpha = \arcsin\frac{d}{R_p}$$

refers to an elevation angle between the connecting point and the horizontal revolute joint, $R_p$ is an equivalent rotation radius, $2d_t$ refers to a horizontal distance between the two connecting points of the rods and the rotatable platform; $H_0$ refers to an equivalent height of the vertical column.

The length L of a rod is calculated as:

$$L=\sqrt{l_0^2+(R\sin\theta_0-d_1)^2}$$

wherein $l_0=\sqrt{(H_0+d)^2+(R_p\cos\alpha-R\cos\theta_0)^2}$

The azimuth angle of the instrument is assumed as $\gamma(-180\leq\gamma\leq180)$ and the pitch angle of the instrument is assumed $\phi(0\leq\phi\leq90)$; the central angles of sliding mechanisms are assumed as $\theta_1$ and $\theta_2$, respectively.

$$\Delta\theta = \theta_1 - \theta_2$$
$$= \arccos\frac{d_1^2+H_0^2+R_p^2+R^2-L^2-2H_0R_p\sin(\phi-\alpha)}{2R\sqrt{R_p^2\cos^2(\phi-\alpha)+d_1^2}} +$$
$$\arccos\frac{R_p\cos(\phi-\alpha)}{\sqrt{R_p^2\cos^2(\phi-\alpha)+d_1^2}}$$

the central angles of the mounting base can be derived as:

$\theta_1=\gamma+\Delta\theta$ $\theta_2=\gamma-\Delta\theta$

According to another embodiment, a radio telescope having a mounting base for supporting and rotating an instrument about two perpendicular axes is disclosed.

According to another embodiment, a radar having a mounting base for supporting and rotating an instrument about two perpendicular axes is disclosed.

According to another embodiment, a camera having a mounting base for supporting and rotating an instrument about two perpendicular axes is disclosed.

According to another embodiment, a heliostat mirror having a mounting base for supporting and rotating an instrument about two perpendicular axes is disclosed.

According to another embodiment, a solar panel having a mounting base for supporting and rotating an instrument about two perpendicular axes is disclosed.

The parallel mounting base for supporting and rotating an instrument about two perpendicular axes, can be operated with 0-90 degrees pitch motion and −180-180 degrees azimuth motion. The external instrument may be a radar, a radio telescope, a camera, a heliostat mirror and a solar panel. The mounting base has a simple structure and can be operated easily, avoiding the problems of a bulky structure and a large driving power for a heavy instrument supported by the traditional mounting base. The mounting base of the invention is a parallel mechanism, which has two sliding mechanism driving the rotatable platform at the same time, and thus has potential advantages of light weight, high pointing accuracy and low driving power. Moreover, the two sets of driving components (a servo motor, a reducer and a gear pair) are located at the bottom of the mounting base, and thus the weight of the rotating part is reduced. Further, the parallel driving can be operated with a 0-90 degrees pitch angle and an arbitrary azimuth angle, and also can reduce the driving power, equally distribute the joints errors and improve the pointing accuracy.

DETAILED DESCRIPTION OF THE EMBODIMENTS

The foregoing objects, features and advantages of the present invention will become more apparent from the following detailed description of the present invention when taken in conjunction with the accompanying drawings. Embodiments of the present invention will now be further described in detail with reference to the accompanying drawings.

Figure 1:
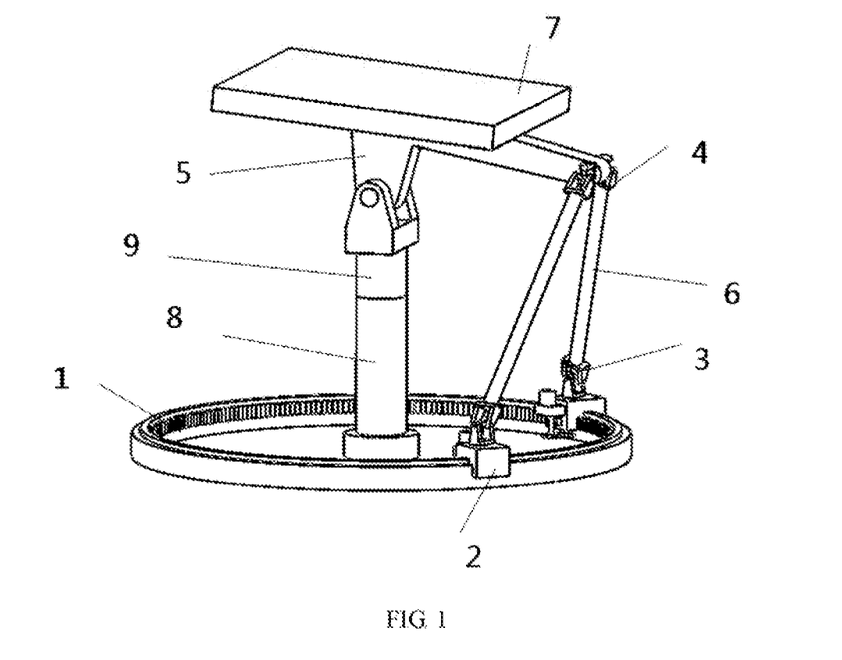
FIG. 1 illustrates the schematic view of the mounting base according to one embodiment.

According to one embodiment, referring to FIG. 1, a two-axis mounting base for supporting and rotating an external instrument may be disclosed, involving 0-90 degrees pitch angle and −180-180 degrees azimuth angle. The external instrument may be a radar, a radio telescope, a camera, a heliostat mirror, a solar panel and etc.

Referring to FIG. 1, the two-axis mounting base may include vertical column 8 rotatable platform 7 attached to vertical column 8 by first revolute joint 5, circular rail 1 around vertical column 8, two rods 6, and two sliding mechanisms 2. Two rods 6 may be both connected with first revolute joint 5 at upper ends, and two sliding mechanisms 2 may be connected with two rods 6 respectively at the lower ends. Two sliding mechanisms 2 may slide on the circular rail 1.

Referring to FIG. 1, the rotatable platform carrying the external instrument may be connected to vertical column 8 by first revolute joint 5 with a horizontal axis. Column 8 may be connected to the ground or external base by second revolute joint 9 with a vertical axis.

The vertical axis of column 8 may be located at the center of circular rail 1. In particular, the center of horizontal circular rail 1 may be located at the projection point of column 8.

In this embodiment, the upper ends of two rods 6 may be connected with first revolute joint 5 by universal joints 4. Two rods 6 may be connected with first revolute joint 5 in other ways.

Figure 2:
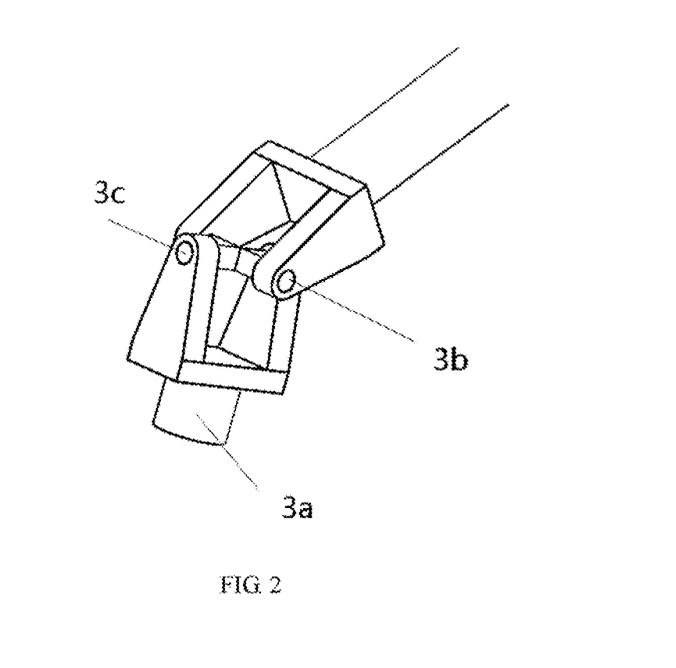
FIG. 2 illustrates a three-rotational-degrees-of-freedom (DoF) joint at the lower end of a rod as showed in FIG. 1.

In this embodiment, sliding mechanisms 2 are connected with the lower ends of two rods 6 by three-rotational-degrees-of-freedom (DoF) joints 3. More specifically, referring to FIG. 2, one three-rotational DoF joint 3 may have three revolute joints 3a, 3b, 3c intersecting at one point. The three-rotational DoF joint 3 may be considered as a universal joint attached to a revolute joint.

Figure 3:
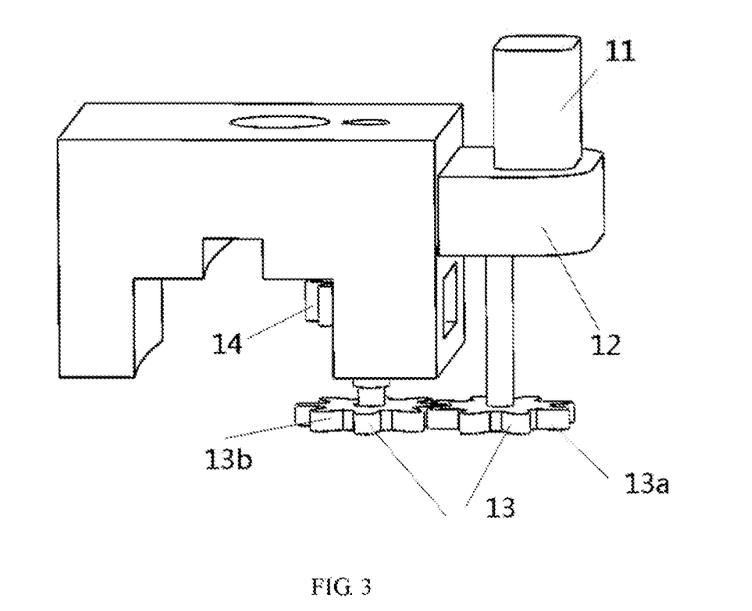
FIG. 3 illustrates a sliding mechanism as showed in FIG. 1.

Referring to FIG. 3, the sliding mechanism 2 may include servo motor 11, reducer 12 attached to servo motor 11, and gear pair 13. Two gears 13*a*, 13*b* of the gear pair 13 may engage with each other.

Figure 4:
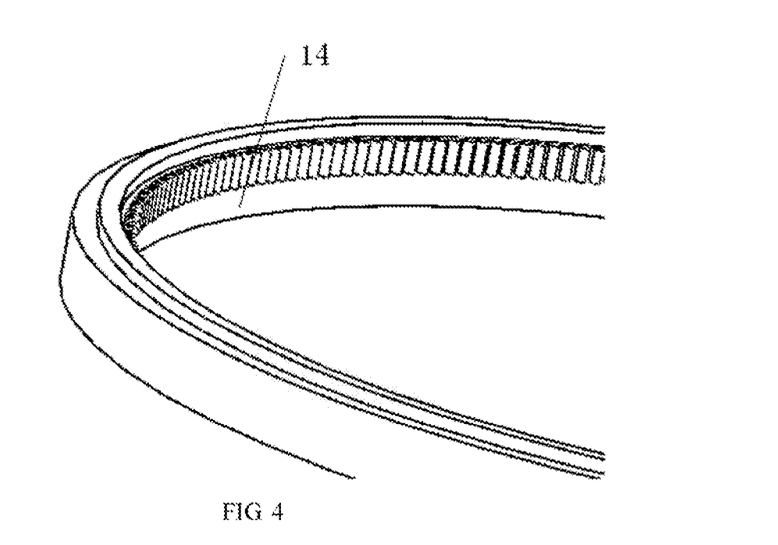
FIG. 4 illustrates a circular rack on an inner lateral face of a circular rail as showed in FIG. 1.

Further, referring to FIG. 4, a rack may be provided on the inner lateral face of rail 1. One gear 13*b* of gear pair 13 may be engaged with rack 14. Gear pair 13 may be located between column 8 and rack 14, and gear pair 13 is driven by the servo motor 11 and the reducer 12.

Column 8 may be connected with ground or an external base by second revolute joint 9. The axis of the column 8 may be perpendicular to the axis of first revolute joint 5.

In this embodiment, the shape of rail 1 may be circular. The shape of rail 1 may be elliptical or other shape surrounding column 8.

Figure 5:
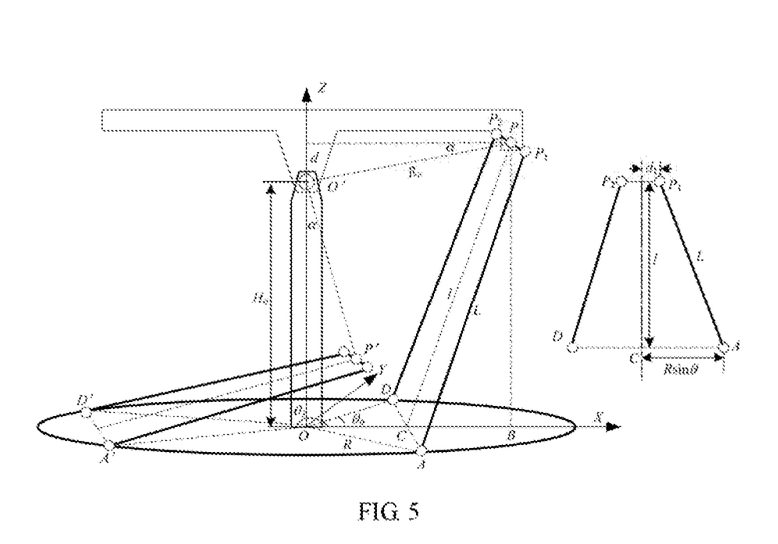
FIG. 5 illustrates the working principle of a two-axis mounting base, according to one embodiment.

Referring to FIG. 5, the working principle of the mounting base is illustrated as below. Specifically, there is horizontal circular rail 1 with a radius of R. The center of rail 1 may be located at the projection point O of column 8 on an external base. Rotatable platform 7 is connected to circular rail 1 with two identical limbs $P_1A$, $P_1D$. Each of the limbs $P_1A$, $P_1D$ includes upper universal joint 4, rod 6 with a fixed length L, lower three-rotational-DoF joint 3 and sliding mechanism 2. The two ends of the horizontal link $P_1P_2$ are connected to rod 6 by two upper universal joints 4. The horizontal link $P_1P_2$ is connected to rotatable platform 7 with revolute joint 5. Rods 6 are connected to sliding mechanisms 2 by two lower three-rotational-DoF joints 3.

Referring to FIG. 5, the closest distances and central angles of sliding mechanisms 2 on both sides of the circular rails are determined firstly according to the condition of interference-free when only generating pitch angle of rotatable platform 7. And then the central angles $\theta_0$ and $\theta_1$ of sliding mechanisms 2 can be worked out accordingly. Therefore, the radius of the circular trail R is calculated as follows.

$$R = \frac{H_0(R_p\cos\alpha + d)}{d_1(\sin\theta_0 - \sin\theta_1) - d\cos\theta_1 + R_p\cos\alpha\cos\theta_0}$$

Where $\alpha = \arcsin\frac{d}{R_p}$.

The length L of rod 6 is eventually determined as follows:

$$L = \sqrt{l_0^2 + (R\sin\theta_0 - d_1)^2}$$

Where $l_0 = \sqrt{(H_0+d)^2 + (R_p\cos\alpha - R\cos\theta_0)^2}$

The azimuth angle of the instrument is assumed as $\gamma(-180 \leq \gamma \leq 180)$ and the pitch angle of the instrument is assumed as $\phi(0 \leq \phi \leq 90)$. Further, the central angles of sliding mechanism of D and A are assumed as $\theta_1$ and $\theta_2$, respectively. Then, $$\Delta\theta = \theta_1 - \theta_2$$
$$= \arccos\frac{d_1^2 + H_0^2 + R_p^2 + R^2 - L^2 - 2H_0R_p\sin(\phi-\alpha)}{2R\sqrt{R_p^2\cos^2(\phi-\alpha) + d_1^2}} +$$
$$\arccos\frac{R_p\cos(\phi-\alpha)}{\sqrt{R_p^2\cos^2(\phi-\alpha) + d_1^2}}$$

further, the inverse orientation can be derived as follows.

$$\theta_1 = \gamma + \Delta\theta$$
$$\theta_2 = \gamma - \Delta\theta$$

Which is used to control the two axis mounting base for a desired orientation.

Figure 6:
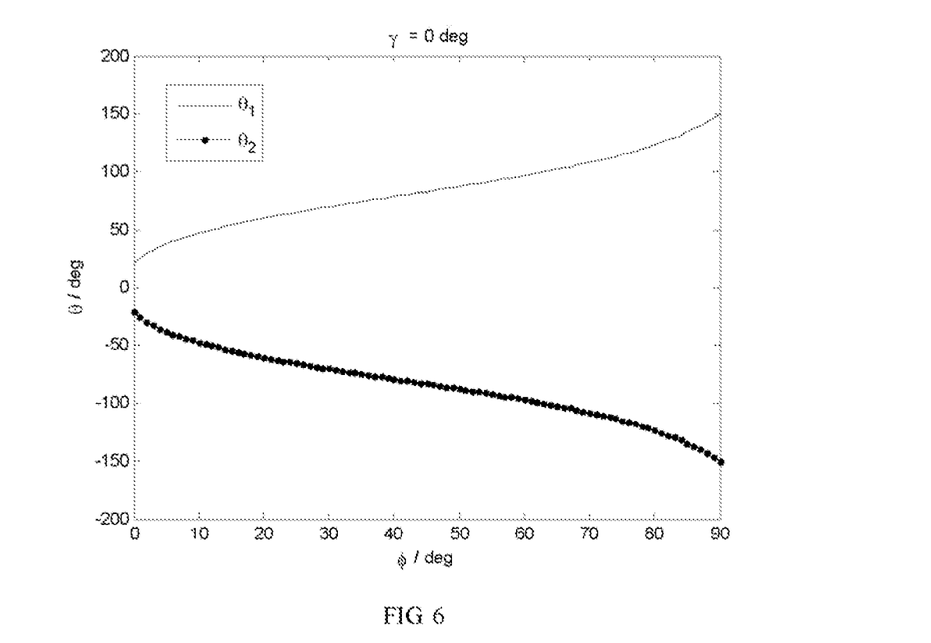
FIG. 6 illustrates a line chart of $\theta_1$ and $\theta_2$ with respect to $\phi$ for $\gamma=0$.
Figure 7:
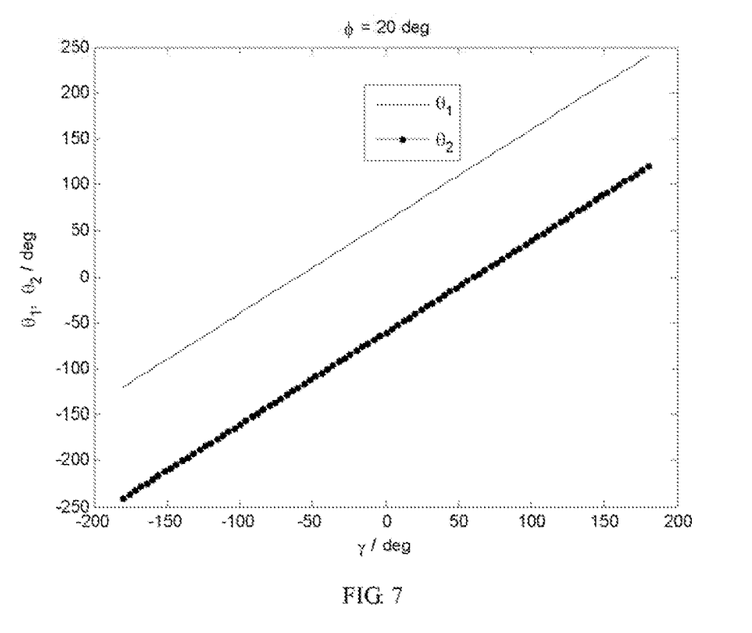
FIG. 7 illustrates a line chart of $\theta_1$ and $\theta_2$ with respect to $\gamma$ for $\phi=20$ degrees.

Referring to FIG. 6, the variation of $\theta_1$ and $\theta_2$ with respect to $\phi$ for $\gamma=0$ is showed. Referring to FIG. 7, the variation $\theta_1$ and $\theta_2$ with respect to $\gamma$ for $\phi=20$ degrees is showed.

The pitch angle $\phi$ and azimuth angle $\gamma$ according to $\theta_1$ and $\theta_2$ are calculated as follows.

$$\gamma = \frac{\theta_1 + \theta_2}{2}$$

$$\phi = \eta + \alpha - \arccos\frac{d_1^2 + H_0^2 + R_p^2 + R^2 - L^2 - 2d_1R\sin\theta}{2R_p\sqrt{R^2\cos^2\theta + H_0^2}}$$

Where $\eta = \arccos\frac{R\cos\theta}{\sqrt{R^2\cos^2\theta + H_0^2}}$

Figure 8:
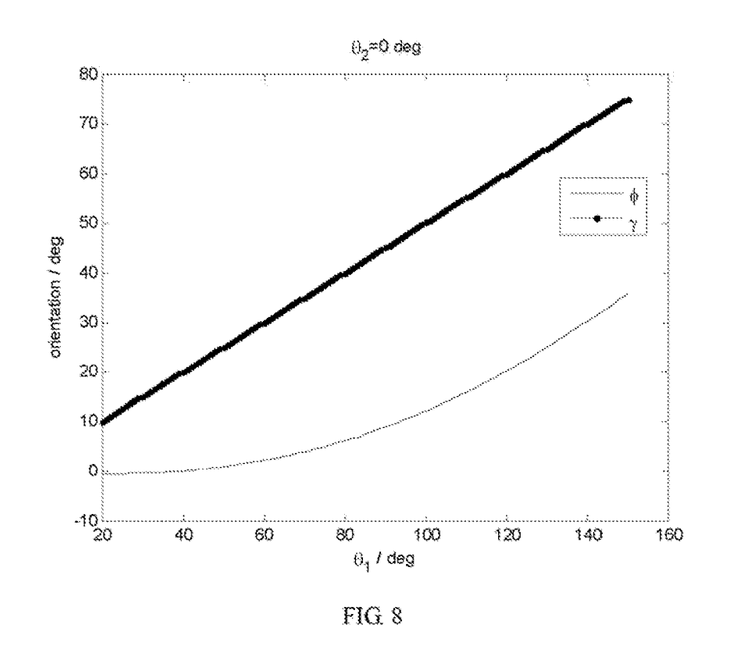
FIG. 8 illustrates a line chart of $\phi$ and $\gamma$ with respect to $\theta_1$ for $\theta_2=0$.
Figure 9:
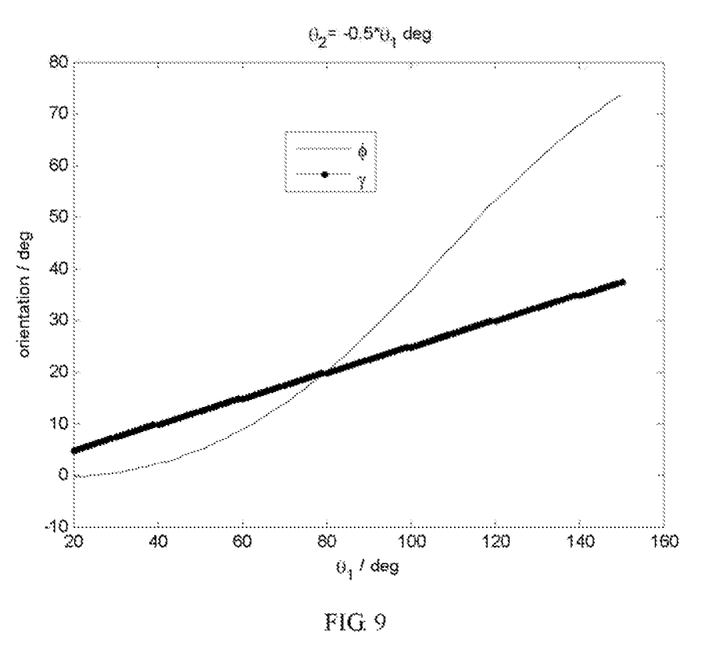
FIG. 9 illustrates a line chart of $\phi$ and $\gamma$ with respect to $\theta_1$ for $\theta_2=-0.5\theta_1$.

Referring to FIG. 8, the variation of $\phi$ and $\gamma$ with respect to $\theta_1$ for $\theta_2=0$ is showed. Referring to FIG. 9, the variation of $\phi$ and $\gamma$ with respect to $\theta_1$ for $\theta_2=-0.5\theta_1$ is showed.

This two-axis mounting base is a parallel mechanism, i.e., it has two sliding mechanisms which actuate the rotatable platform at the same time, and thus has the potential advantage of a light weight and can be actuated with low power. In particular, the actuators (servo motors) are located at the bottom, and thus the weight is reduced. Further, the rods of the parallel mechanism are relatively thin and light. The sliding motion of the rods 6 (servo motor) leads to the alt-azimuth of the rotatable platform 7, and 0-90 degrees angle of elevation and arbitrary azimuth can be formed. This two-axis mounting base is light in weight and can be controlled with arbitrary azimuth.

We claim:

1. A mounting base for supporting and rotating an instrument about two perpendicular axes, comprising:
   a vertical column;
   a rotatable platform attached to the column by a first revolute joint, wherein the first revolute joint is positioned at a lower surface of the rotatable platform;
   a circular rail provided around the vertical column, wherein the vertical column is positioned at a center of a circle formed by the circular rail;
   at least one rod connected to the first revolute joint at a first end of the at least one rod;
   at least one sliding mechanism, connecting with a second end of the at least one rod, wherein the sliding mechanism is configured to slide on the circular rail.

2. The mounting base of claim 1, wherein the mounting base includes two rods and two sliding mechanisms, upper ends of the two rods are both connected with the first revolute joint; lower ends of the two rods are connected with the two sliding mechanisms respectively; and the two sliding mechanisms are configured to slide on the circular rail.

3. The mounting base of claim 1, wherein the at least one rod is connected with the first revolute joint by a universal joint.

4. The mounting base of claim 1, wherein the at least one sliding mechanism is connected with the second end of the at least one rod by a three-rotational-degrees-of-freedom joint, wherein the three-rotational-degrees-of-freedom joint has three revolute joints intersecting at one point.

5. The mounting base of claim 4, wherein the at least one sliding mechanism includes a gear pair, a servo motor and a reducer attached to the servo motor, wherein one gear of the gear pair engages with the circular rail.

6. The mounting base of claim 5, wherein a rack is provided on an inner lateral face of the circular rail; and the one gear of the gear pair engages with the rack.

7. The mounting base of claim 6, wherein the gear pair is located between the column and the rack, and the gear pair is driven by the servo motor and the reducer.

8. The mounting base of claim 1, wherein the column is connected with ground or an external base by a second revolute joint.

9. The mounting base of claim 1, wherein an axis of the column is perpendicular to an axis of the first revolute joint.

10. A mounting base for supporting and rotating an instrument about two perpendicular axes, comprising:
a vertical column;
a rotatable platform attached to the column by a first revolute joint, wherein the first revolute joint is positioned at a lower surface of the rotatable platform;
a circular rail provided around the vertical column, wherein the vertical column is positioned at a center of a circle formed by the circular rail;
at least one extendable linear actuator, wherein a first end of the at least one actuator is connected to the first revolute joint;
at least one sliding mechanism, connecting to a second end of the at least one extendable linear actuator, wherein the sliding mechanism is configured to slide on the circular rail.

11. The mounting base of claim 10, wherein the mounting base includes two extendable linear actuators and two sliding mechanisms, upper ends of the two extendable linear actuators are both connected with the first revolute joint; lower ends of the two extendable linear actuators are connected with the two sliding mechanisms respectively; and the two sliding mechanisms are configured to slide on the circular rail.

12. The mounting base of claim 11, wherein the two extendable linear actuators are connected with the first revolute joint by universal joints.

13. The mounting base of claim 11, wherein the sliding mechanisms are connected with the two extendable linear actuators by a three-rotational-degrees-of-freedom joint, wherein the three-rotational-degrees-of-freedom joint has three revolute joints intersecting at one point.

14. The mounting base of claim 13, wherein each sliding mechanism includes a gear pair, a servo motor and a reducer attached to the servo motor, wherein one gear of the gear pair engages with the circular rail.

15. The mounting base of claim 14, wherein a rack is provided on an inner lateral face of the circular rail; and the one gear of the gear pair engages with the rack.

16. The mounting base of claim 15, wherein the gear pair is located between the column and the rack, and the gear pair is driven by the servo motor and the reducer.

17. A mounting base for supporting and rotating an instrument about two perpendicular axes, comprising:
a vertical column;
a rotatable platform attached to the column by a first revolute joint, wherein the first revolute joint is positioned at a lower surface of the rotatable platform;
a circular rail provided around the vertical column, wherein the vertical column is positioned at a center of a circle formed by the circular rail;
two rods, wherein upper ends of the two rods are both connected to the first revolute joint;
two sliding mechanisms, connecting with lower ends of the two rods respectively, wherein the two sliding mechanisms are configured to slide on the circular rail;
wherein the column is located at a center of the rail; the two rods are connected with the first revolute joint by a universal joint;
the two sliding mechanisms are connected with lower ends of the two rods by a three-rotational-degrees-of-freedom joint;
each sliding mechanism includes a gear pair, a servo motor and a reducer attached to the servo motor; a rack is provided on an inner lateral face of the rail;
wherein one gear of the gear pair engages with the rack; the gear pair is driven by the servo motor and the reducer; and
an axis of the column is perpendicular to an axis of the first revolute joint.

* * * * *